3,267,614
INTERCHANGEABLE SEALING DEVICE FOR JOINING A DETACHABLE COMPONENT TO A RIGID WALL
Jean-Pierre Cazalis, Bezons, and Jean Vertut, Paris, France, assignors to Commissariat à l'Energie Atomique, Paris, France
Filed Nov. 1, 1963, Ser. No. 320,640
Claims priority, application France, Nov. 8, 1962, 914,849
9 Claims. (Cl. 49—488)

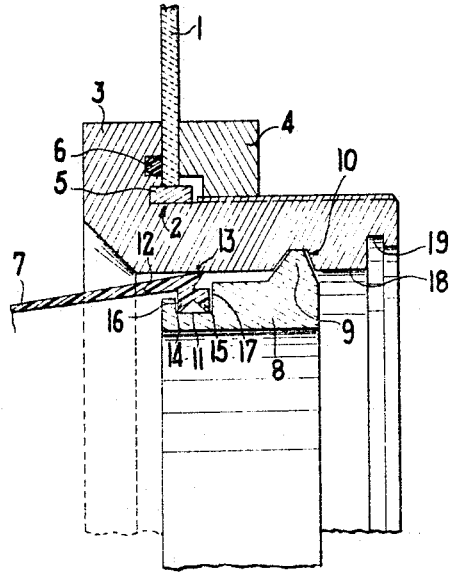
FIG. 1
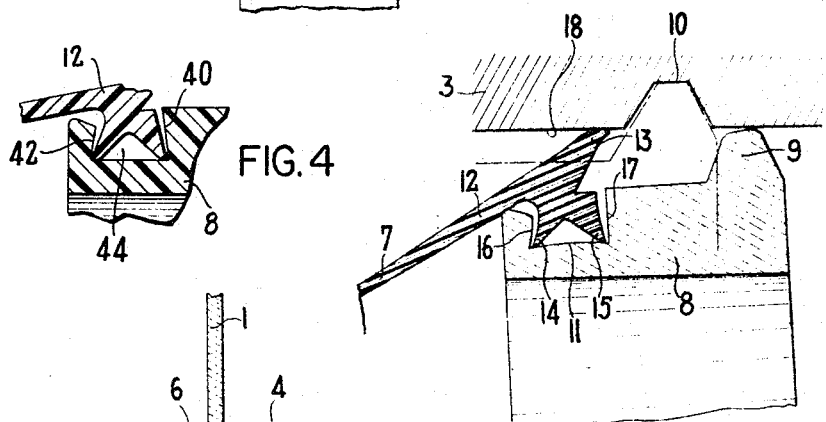
FIG. 4
FIG. 2
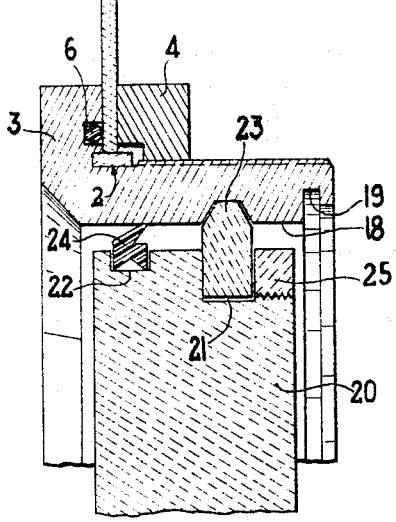
FIG. 3
INVENTORS
JEAN-PIERRE CAZALIS
BY JEAN VERTUT
Bacon & Thomas
ATTORNEYS United States Patent Office 3,267,614
Patented August 23, 1966

The present invention relates to an interchangeable sealing device for joining a detachable component to a rigid wall and relates especially, although not exclusively, to a device which serves to provide a leak-tight joint between a totally enclosed chamber such as a cell for the manipulation of radioactive objects and a component to be mounted on said cell and which can be either a glove or flexible bellows employed for the purpose of penetrating within said chamber, or alternatively a transparent inspection window, for example.

If the leakproof chamber is of the "glove box" type commonly employed in nuclear research laboratories, the detachable glove or component which accordingly serves to provide insulation between the outer atmosphere and the interior of the chamber is secured to the exterior of a support member or bushing fitted in the opening or so-called hand hole which is formed in the wall of the glove box. Leak-tightness is usually ensured by the elasticity of the glove when extended, said glove being securely fastened in position by means of a beaded edge which is adapted to fit inside an external channel formed in the periphery of the hand-hole bushing. It is also possible to achieve leak-tightness from the interior by means of a holding sleeve which is so designed that the glove beading in the form of an O-ring seal is compressed between said holding sleeve and the interior of the hand-hole bushing, whilst the relative immobilization of the two members is effected by clamping said holding sleeve inside said bushing.

However, the arrangements referred-to above present a number of drawbacks. In the first place, it is fairly difficult to replace such parts in any way other than by hand, which presents a serious disadvantage when such a replacement has to be carried out in a radioactive atmosphere with substantial attendant danger of exposure to radiation. In the second place, the use of beaded edges calls for very close mechanical tolerances between the edges of the hand hole and the holding sleeve, and the leak-tightness achieved by the beaded edge referred-to is furthermore a function of its compression, therefore calling for a substantial clamping effort which it is difficult to apply in the case of large diameters. In addition, the immobilization of the combined assembly usually remains inadequate.

The object of the present invention is to overcome the disadvantages referred to above by means of a device of very simple design which can be either positioned or replaced from a distance and which provides a high degree of leak-tightness even in the case of openings of large diameter or irregular shape while permitting relatively wide tolerances on dimensions, said device additionally ensuring satisfactory immobilization of the various components which are fitted into each other.

To this end, the device in accordance with the invention, which makes it possible in particular to provide a leak-tight joint between a hand-hole bushing and a detachable component which is designed to be fitted in said bushing, is essentially characterized in that said device comprises a semi-rigid internal sleeve for the purpose of securely fastening said detachable component in the interior of the hand-hole bushing, and a sealing joint having at least two lips which are applied at the same time against said internal sleeve and against the internal wall of said bushing.

In a first form of embodiment of the invention which is more especially adapted to the case in which the detachable component consists of a flexible element such as a glove or protective bellows, the device is constituted by a semi-rigid sleeve which is provided on the one hand with a beaded edge for the purpose of immobilizing said sleeve by engagement of said beaded edge inside a groove formed in the hand-hole bushing and on the other hand with a circular channel inside which is fitted that extremity of the glove which forms a sealing joint and the lips of which are applied both against the bottom of said channel and against the internal wall of said hand-hole bushing. As an advantageous feature, the glove or flexible bellows can be produced by molding from a suitable material such as polyvinyl chloride or an elastomer, in such a manner that the end of the glove is made to correspond exactly to the desired shape of sealing joint.

In a second form of embodiment in which the detachable component consists of a full shutter or closure such as, for example, a transparent inspection window, the fixation beading and sealing joint are separate and mounted one beside the other inside two channels of suitable depth which are formed in the lateral face of the shutter.

A better understanding of the invention will in any case be had from the complementary description which follows below and which relates to two examples of embodiment, said examples being given solely by way of indication without any limitation being implied.

In the accompanying drawings:

FIG. 1 is a diagrammatic sectional view of a sealing device constructed in accordance with a first form of embodiment of the invention;

FIG. 2 is a view taken on a larger scale of a portion of the device of FIG. 1 showing the shape of the sealing joint and defining the manner in which the positioning operation is carried out;

FIG. 3 is a sectional view of a device constructed in accordance with a second form of embodiment of the invention; and, FIG. 4 is a fragmentary, sectional view showing a modified form of the channel in which the deformable sealing joint is mounted.

In the example which is shown in FIG. 1, leak-tightness is achieved between a flexible tubular member such as a protective glove and the wall of a leakproof chamber. As can be seen in this figure, said leakproof chamber or "glove box" comprises a wall 1 of sheet metal or of transparent material. The said wall is pierced with an opening 2 having a diameter which is determined according to the dimensions of a hand-hole bushing 3, said bushing being maintained in a stationarily fixed position against the wall of the chamber by means of a locking nut 4. A tang-end 5 which is integral with the hand-hole bushing 3 prevents the rotation of the outer sleeve, whilst a conventional O-ring seal 6 provides a leak-tight separation for the assembly of the member 3. It is assumed in this form of embodiment that the internal portion of the chamber is located on the left-hand side of the wall 1 as shown in the figure.

In accordance with the invention, the leak-tight joint between the wall of the chamber, or more precisely between the hand-hole bushing 3 and a rubber glove 7 is provided by means of a semi-rigid annular sleeve 8 which is fabricated, for example, of polyethylene. Said sleeve is provided with a cylindrical beading 9 which is adapted to fit, as shown in the figure, inside a circular groove 10 formed in the internal wall of the hand-hole bushing 3. In that portion thereof which is directed towards the interior of the chamber, the sleeve 8 is additionally provided with an annular channel 11 which is preferably located at an appreciable distance from the beading 9 and in which is adapted to fit the extremity 12 or sealing joint of the glove 7. Said glove extremity or rim directly constitutes the sealing joint of the device; accordingly, said extremity is obtained by molding in such manner as to form three lips, namely one outer lip 13 and two inner lips 14 and 15 which penetrate in the channel 11 of the sleeve 8. Said channel 11 is rectangular and the width thereof is slightly larger than the distance between the two inner lips 14 and 15. The sides 16 and 17 of the channel 11 endow this latter with a rectangular cross-section or alternatively as shown in FIG. 4, the sides 40 and 42 of the channel 44 endow this channel with a dovetail cross-section, and the sealing joint accordingly only bears against the inner wall of the hand-hole bushing 3 on the one hand and against the coupling sleeve 8 on the other hand through the extremities of the lips 13, 14 and 15. By virtue of the arrangement hereinabove described, particularly effective leak-tightness is thus achieved even if the efforts applied on the glove 7 are substantial. In fact, when a pull is exerted on the glove, the joint 12 has a tendency to flatten slightly while the lip 13 remains permanently in contact with the internal cylindrical portion 18 of the hand-hole bushing 3 and the two lips 14 and 15 are permitted to move apart to a slight extent and subsequently touch the two sides 16 and 17 of the channel 11. A joint of this type can in fact be subjected to substantial compression while continuously maintaining insulation between the interior of the chamber and the outer air by means of the glove.

FIG. 2 shows in greater detail the particular arrangement of the sealing joint 12 and serves to define the manner in which the device is both set in position and replaced from a distance by another sealing device of similar design. In the position which is shown in full lines, the sleeve 8 bears against the interior of the cylindrical portion 18 of the bushing 3, said sleeve 8 being thus subjected to elastic deformation by reason of the fairly small height of the beading 9. When said deformation takes place, the diameter of channel 11 is slightly reduced, but the bending movements of the joint 12 are so determined that the lip 13 is constantly applied against the inner wall of the hand-hole bushing 3. The combined assembly comprising the sleeve 8 and joint 12 being thus displaced towards the left, the beaded edge 9 engages inside the groove 10 after the fashion of a snap ring so as to come into the position shown in chain-dotted lines. If it is then desired to change a sleeve which has been previously fitted in position (for example with a view to replacing the glove 7 by another component), it is merely necessary to displace the complete device towards the left by means of the new sleeve to be substituted, said displacement being effected by any suitable operating means which are provided, for example, with a push-rod which can be attached to the hand-hole bushing 3 inside a locking channel 19 formed in the frontal portion of said bushing (as shown in FIG. 1). It can thus readily be understood that the replacement of one ring by another can be carried out without interrupting the continuity of the seal inasmuch as the upper lip 13 of the sleeve to be replaced continues to be applied against the portion 18 until the new sleeve and the joint carried by said sleeve have been set in position in their turn.

FIG. 3 illustrates the application of the device in accordance with the invention to a full shutter or closure which may or may not be transparent. Identical reference numerals have been employed in this figure, in particular for the purpose of designating the wall, the hand-hole bushing and the various rigid elements which have no direct bearing on the constructional design of the sealing device. The shutter or closure 20 comprises two channels 21 and 22 in which are respectively disposed a semi-rigid ring 23 for the purpose of securing the shutter in position and a sealing joint 24 with lips. The ring 23 and the sealing joint 24 play a part which is identical in every respect to that played by the beaded edge 9 and the extremity of the glove 12 as hereinabove described with reference to FIG. 1.

In order to facilitate the assembly of the ring 23, the channel 21 has sides of unequal height or can even be formed by means of a cylindrical collar 25 which is screwed onto the shutter after the sleeve has been fitted in position. It should also be noted that the sleeve can be split so as to fit inside the shutter while nevertheless remaining compressible as in the preceding example. In addition, the assembly can be completed by means of keys (which have not been shown in the drawings) and which secure the bushing 3 to the shutter 20 so as to prevent this latter from pivoting about its axis.

As a consequence, and irrespective of the form of embodiment chosen, a particularly effective interchangeable sealing device is produced which is capable of being adapted to substantial hole diameters without requiring extremely accurate machining either of the bushing or of the locking ring. It will in fact be observed that the sides 16 and 17 of the channel 11 (or channel 22) are so designed that it is practically impossible for the sealing joint 12 (or sealing joint 24) to escape from said channel as a result of a substantial pulling effort applied on the glove 7 or as a result of a thrust applied on the shutter 20. Moreover, a number of alternative shapes can be devised for the sealing joints; in particular, the single lip 13 could be replaced by a multiple lip, for example a double or triple lip made of any suitable material.

It will be understood that the invention is not limited in any sense to the forms of embodiment which have been described and illustrated but is intended on the contrary to include within its scope all alternative forms.

What we claim is:

1. A sealing device for joining a detachable component to a rigid wall, comprising: a rigid wall having a passageway extending therethrough, the perimeter of said passageway including a continuous sealing surface extending therearound and a groove adjacent said sealing surface; and a detachable component mounted in said passageway, said detachable component having an outwardly extending, semi-rigid bead disposed in said groove securely and detachably fastening said detachable component in said passageway, said detachable component including a continuous channel facing said sealing surface of said passageway; and a deformable sealing joint having at least two sealing lips, one being in sealing engagement with a surface of said channel and the other being in sealing engagement with said sealing surface.

2. A sealing device in accordance with claim 1 in which the channel which contains the sealing joint has a rectangular profile.

3. A sealing device in accordance with claim 1 in which the channel which contains the sealing joint has a dovetail profile.

4. A sealing device in accordance with claim 1 in which the sealing joint is fabricated of polyvinyl chloride.

5. A sealing device in accordance with claim 1 in which said deformable sealing joint has three sealing lips, two of said sealing lips being in sealing engagement with the bottom wall of said channel.

6. A sealing device for joining a detachable component to a rigid wall, comprising: a rigid wall having a passageway extending therethrough, the perimeter of said passageway including a continuous sealing surface extending therearound and a groove adjacent said sealing surface; and a detachable component mounted in said passageway, said detachable component comprising a semi-rigid sleeve having an outwardly extending bead disposed in said groove securely and detachably fastening said sleeve in said passageway, said semi-rigid sleeve including a continuous channel facing said sealing surface of said passageway; and a deformable sealing joint mounted in said channel, said deformable sealing joint having at least two sealing lips, one being in sealing engagement with a surface of said channel and the other being in sealing engagement with said sealing surface.

7. A sealing device in accordance with claim 6 in which the semi-rigid sleeve is fabricated of polyethylene.

8. A sealing device for joining a detachable component to a rigid wall, comprising: a rigid wall having a passageway extending therethrough, the perimeter of said passageway including a continuous sealing surface extending therearound and a groove adjacent said sealing surface; and a detachable component mounted in said passageway, said detachable component comprising a closure having an outwardly extending, semi-rigid bead disposed in said groove securely and detachably fastening said closure in said passageway, said closure including a continuous channel facing said sealing surface of said passageway; and a deformable sealing joint having at least two sealing lips, one being in sealing engagement with a surface of said channel and the other being in sealing engagement with said sealing surface.

9. A sealing device for joining a detachable component to a rigid wall, comprising: a rigid wall having an elongated, circular passageway extending therethrough, the perimeter of said passageway including a continuous, annular sealing surface extending therearound and a generally V-shaped, annular groove adjacent said sealing surface; and a detachable component comprising a semi-rigid, circular sleeve having a generally V-shaped, peripheral bead disposed in said groove securely and detachably fastening said sleeve in said passageway, said semi-rigid sleeve including a continuous channel facing said sealing surface of said passageway; and a deformable sealing joint mounted in said channel, said deformable sealing joint having at least two sealing lips, one being in sealing engagement with a surface of said channel and the other being in sealing engagement with said sealing surface, said semi-rigid circular sleeve, said peripheral bead and said sealing joint being deformable upon the application of sufficient force thereto in a direction axial thereof for removing a sealed, detachable component from its mounting in said passageway and for inserting and mounting in said passageway a sealed, detachable component.

References Cited by the Examiner
UNITED STATES PATENTS

| | | | |
|---|---|---|---|
| 773,965 | 11/1904 | McIntyre et al. | |
| 3,000,014 | 9/1961 | White | 285—260 X |
| 3,084,684 | 4/1963 | Saunders | 128—1 |
| 3,093,098 | 6/1963 | Rosenfeld | 109—1 |

FOREIGN PATENTS 916,501  8/1954  Germany.

HARRISON R. MOSELEY, *Primary Examiner.*

W. E. HEATON, *Assistant Examiner.*